G. W. HENRY, Jr.
REVERSE SHAFT FOR ARTICULATED LOCOMOTIVES.
APPLICATION FILED SEPT. 5, 1908.
911,395.
Patented Feb. 2, 1909.
2 SHEETS—SHEET 1.
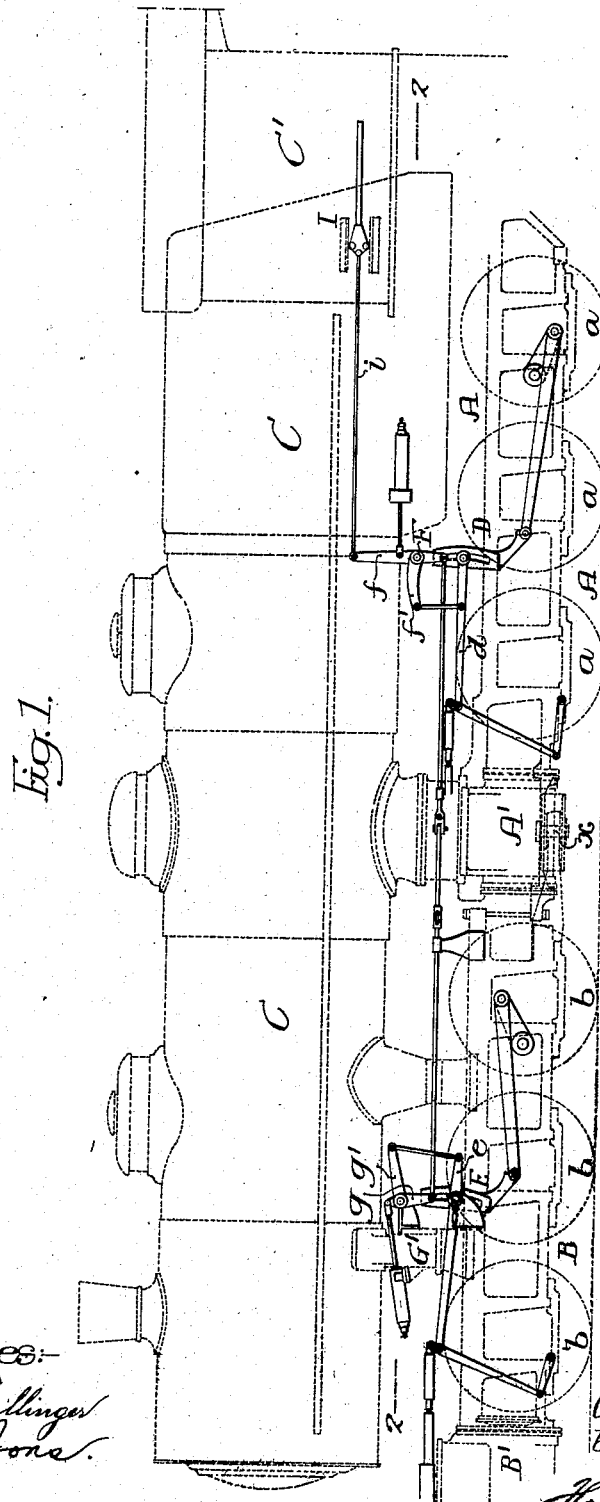
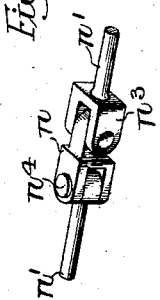
Witnesses:
Inventor
George W. Henry Jr.
by his Attorneys.

G. W. HENRY, Jr.
REVERSE SHAFT FOR ARTICULATED LOCOMOTIVES.
APPLICATION FILED SEPT. 5, 1908.
911,395.
Patented Feb. 2, 1909.
2 SHEETS—SHEET 2.
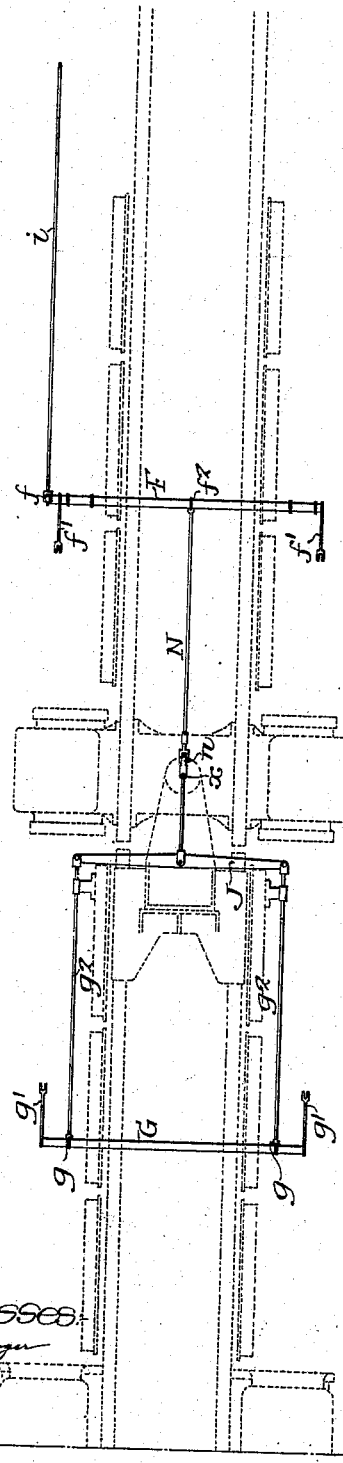
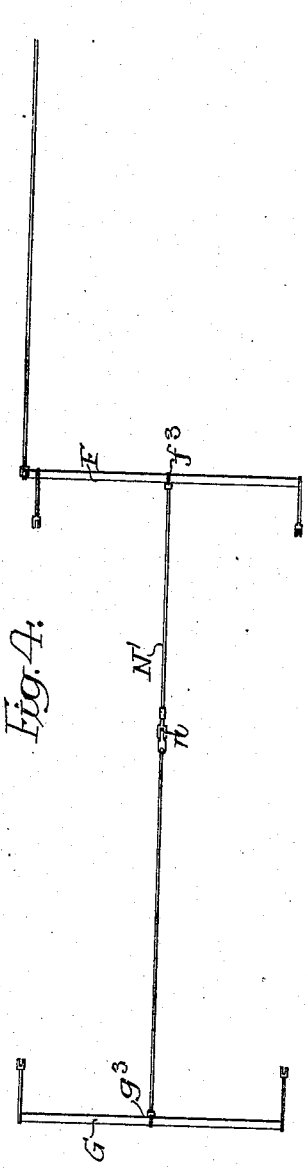
Witnesses
Inventor
George W. Henry, Jr.
by his Attorneys

UNITED STATES PATENT OFFICE.

GEORGE W. HENRY, JR., OF PHILADELPHIA, PENNSYLVANIA, ASSIGNOR TO THE FIRM OF BURNHAM, WILLIAMS & COMPANY, OF PHILADELPHIA, PENNSYLVANIA.

REVERSE-SHAFT FOR ARTICULATED LOCOMOTIVES.

No. 911,395.      Specification of Letters Patent.      Patented Feb. 2, 1909.

Application filed September 5, 1908. Serial No. 451,877.

To all whom it may concern:

Be it known that I, GEORGE W. HENRY, Jr., a citizen of the United States, residing in Philadelphia, Pennsylvania, have invented certain Improvements in Reverse-Shafts for Articulated Locomotives, of which the following is a specification.

My invention relates to certain improvements in that type of locomotive known as the articulated locomotive, and particularly of the compound type, in which there are two frames pivoted together, the boiler being rigidly secured to one frame and overhanging the other frame, with independent driving mechanism on each frame.

In some instances there is a series of driving wheels having their axles journaled in the bearings on each frame, the high pressure cylinders are mounted on the rear frame and drive the wheels mounted in said frame, and the low pressure cylinders are mounted on the forward frame and drive the wheels having the bearings in said frame.

The object of my invention is to provide a single controlling device for the reverse mechanism of the valve gears on both sets of engines, the reverse gear extending from the cab of the locomotive to the link motion on each frame. This object I attain in the following manner, reference being had to the accompanying drawings, in which:—

Figure 1, is a side view of an articulated compound locomotive showing the locomotive in dotted lines and my improvements and the valve gearing in full lines; Fig. 2, is a section on the line 2—2, Fig. 1, showing the two frames of the locomotive in dotted lines and my flexible connecting mechanism in full lines; Fig. 3, is a perspective view showing the universal connection of the controlling rod; and Fig. 4, is a view of a modification of the arrangement of the connecting mechanism.

A is the rear frame of an articulated compound locomotive, B is the forward frame. Carried by the frame A are the high pressure cylinders A'.

a, a are the driving wheels, the axles of said wheels being mounted in suitable bearings in pedestals on the frame A.

B', B' are the low pressure cylinders and b, b are the driving wheels mounted on axles having their bearings in pedestals on the frame B.

C is the boiler, the rear portion of this boiler is mounted in a fixed position on the rear frame A in the present instance, and overhangs the forward frame B; the cab C' is also mounted on the rear frame.

D is the reverse gear for the valve mechanism of the high pressure engine carried by the rear frame A, and E is the reverse gear of the low pressure engine carried by the frame B. This particular form of gearing is known as the "Walschaert" gearing and need not be described as it is fully shown and forms no part of my present invention. Any suitable gearing may be used.

In the present instance, referring to Figs. 1 and 2, F and G are two transverse shafts, one carried by the rear frame A and the other by the forward frame B, and attached to an arm $f$ on the shaft F is an operating rod $i$ extending to the operating mechanism I in the cab of the locomotive. On the shaft F are arms $f'$ which are connected to the shifting rod $d$ of the link motion D.

The transverse shaft G is mounted in suitable bearings G' carried by the frame B of the locomotive and has arms $g'$ at each end connected to the shifting rod $e$ of the link motion E and this shaft G also has arms $g, g$ at each side connected to a yoke J by rods $g^2$ and this yoke is connected to an arm $f^2$ by a rod N having a universal coupling section $n$ at or about the point $x$, where the two frames A and B are coupled together. This joint can be of any of the ordinary types and in the present instance the rod is made up of two sections $n'$, $n^2$ pivoted to the coupling section $n$, one by a horizontal pin $n^3$ and the other by a vertical pin $n^4$, as clearly shown in Fig. 3. In some instances the two parts of the rod may be coupled only by a vertical pin, but by making the joint universal it allows for any lateral movement as well as pivotal movement on the pin $x$. By this arrangement it will be seen that I provide a very simple and accurate means of coupling the two link motions or reverse mechanisms of an articulated locomotive, so that both mechanisms can be operated by actuating a single operating device in the cab of the locomotive.

In Fig. 4, I have shown a modification in which the yoke J is dispensed with and the rod N' extends from an arm $f^3$ on the shaft F to an arm $g^3$ on the shaft G; the rod having the coupling section $n$ at the pivot point and this rod being guided by suitable mechanism on the two frames of the locomotive. This may be desirable in types of articulated locomotives where there is a clear space at the center.

I claim:—

1. The combination in an articulated locomotive, of two frames pivoted together, a valve gear on each frame, a single operating mechanism at the cab of the locomotive, and a rod connecting the two valve mechanisms, said rod being jointed at the point where the two frames are pivoted together.

2. The combination in an articulated locomotive, of two frames pivoted together, valve mechanism on each frame, a transverse shaft on each frame, arms on said shafts connected to the valve gearing on each side of the locomotive, a central rod connecting the two shafts, said rod being pivoted at or about the point where the two frames are pivoted together, and a rod extending from one of said shafts to the operating mechanism in the cab of the locomotive.

3. The combination in an articulated locomotive, of a rear frame and a forward frame pivoted together, independent driving mechanism mounted on each frame, valve gearing on each frame for controlling the valves, a transverse shaft on each frame, arms on each shaft connected to the valve gearing at each side of the locomotive, a yoke, rods connecting the arms on one shaft with said yoke, and a central rod connecting said yoke with an arm on the other shaft, said central rod having a universal connection at or about the pivot point of the frames of the locomotive.

In testimony whereof, I have signed my name to this specification, in the presence of two subscribing witnesses.

GEORGE W. HENRY, Jr.

Witnesses:
   Jos. H. Kleim,
   Wm. A. Barr.